April 3, 1962        T. C. SODDY        3,027,976
BRAKE ARRANGEMENT FOR RAILWAY VEHICLE TRUCK
Filed Nov. 22, 1957        2 Sheets-Sheet 1
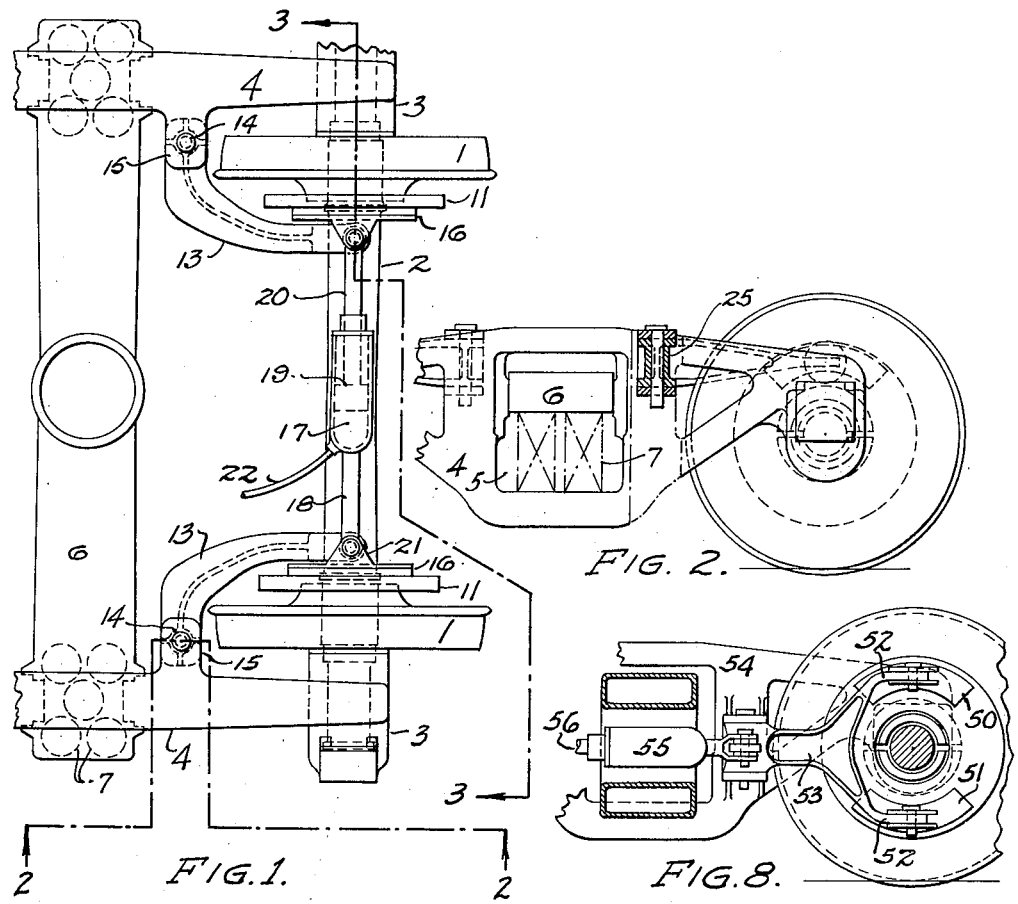
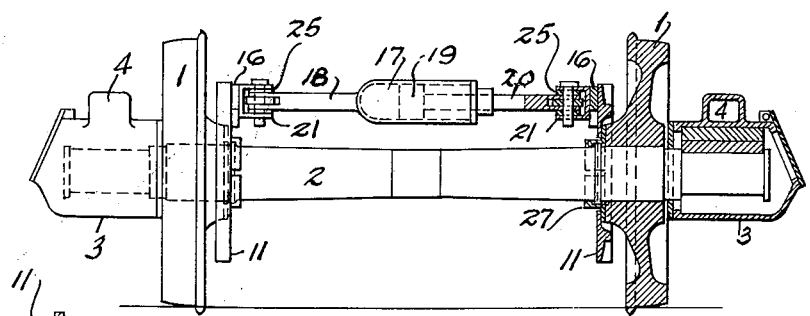
FIG. 3.
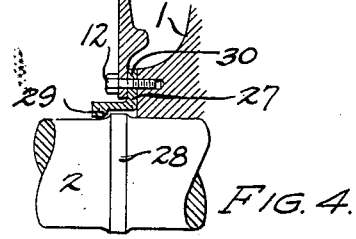
FIG. 4.
Inventor
Thomas C. Soddy
By Rodney Bedell
atty.

April 3, 1962          T. C. SODDY          3,027,976

BRAKE ARRANGEMENT FOR RAILWAY VEHICLE TRUCK

Filed Nov. 22, 1957          2 Sheets-Sheet 2

Inventor
Thomas C. Soddy
By Rodney Bedell
atty.

United States Patent Office 3,027,976
Patented Apr. 3, 1962

3,027,976
BRAKE ARRANGEMENT FOR RAILWAY
VEHICLE TRUCK
Thomas C. Soddy, Downers Grove, Ill., assignor, by mesne assignments, to American Seal-Kap Corporation of Delaware, New York, N.Y., a corporation of Delaware
Filed Nov. 22, 1957, Ser. No. 698,240
9 Claims. (Cl. 188—59)

The invention relates to power brake arrangements for railway vehicle trucks having disk brakes.

The invention comprises the application of brake shoes to disk brakes at points in substantially vertical alignment with the axes of the wheel and axle assemblies, the shoes being carried and applied by horizontally elongated members pivotally supported on the truck framing at points spaced longitudinally of the truck from the wheel and axle assemblies.

The main objects of the invention are to simplify the mounting and operation of the brakes and to avoid vertical loading of the truck frame and springs by the application of the brakes.

These general objects and other detailed objects are attained by the illustrative forms of the invention shown in the accompanying drawings, in which:

FIGURE 1 is a top view of one wheel and axle assembly of a four-wheel car truck, one longitudinal half of each of the two side frames being shown, also the load-carrying bolster mounted on the frames, and illustrating the brake mounting and operating gear.

FIGURE 2 is a side elevation of the truck structure shown in FIGURE 1.

FIGURE 3 is a transverse vertical section on line 3—3 of FIGURE 1.

FIGURE 4 is a detail section drawn to an enlarged scale showing parts indicated in FIGURE 3.

Figure 7:
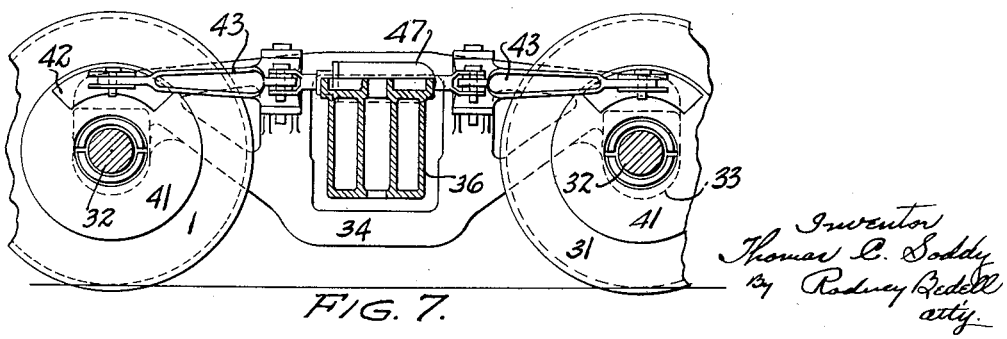
FIGURE 7 is a vertical longitudinal view on line 7—7 of FIGURE 5.

FIGURE 8 corresponds to a portion of FIGURE 7 but shows another form of the invention.

The truck shown in FIGURES 1-4 includes spaced wheel and axle assemblies, one of which is shown, and includes wheels 1, an axle 2, journal boxes 3 integral with, or formed separately from side frames 4. Each of side frames 4 has a bolster window 5 through which the end portions of a bolster 6 project and are supported on springs 7 seated on the bottom member of the side frame window.

A brake disk 11 is secured by bolts 12 to the hub of each wheel 1. Brake mounting members 13 comprise elongated L-shaped levers each having a pivotal connection 14 at one end to a bracket 15 projecting inboard from one of the side frames. Brake shoes 16 are pivotally mounted on the other ends of members 13 and oppose adjacent disks 11.

A fluid pressure actuating device is operatively connected to the swinging ends of members 13, and comprises a cylinder 17, having a rigid extension rod 18, and a piston 19 having a rigid extension rod 20. The outer ends of rods 18 and 20 are pivotally connected to the swinging ends of members 13 and to lugs 21 on the brake shoes. A fluid supply line 22 leads from cylinder 17 to a source of fluid pressure supply such as the air brake reservoir with triple valve ordinarily installed on railway cars.

At the connection between the swinging ends of members 13, brake rods 18, 20 and disks 11, a rubber bushing 25 is provided to absorb dynamic shocks between the fluid pressure device and the other parts due to the cantilever mounting on the side frames.

While the braking thrust of shoes 16 on disks 11 is far less than the pressure required to overcome the press fit of the wheels on the axle, a safety device resisting such movement is provided. As best shown in FIGURE 4, a two part collar 27, split diametrically, surrounds axle 2 inboard of an annular rib 28 on the axle. Collar 27 has an outboard facing shoulder 29 opposing rib 28, and has an inboard facing shoulder 30 opposing an annular face on brake disk 11. Obviously the brake disk cannot move toward the end of the axle. Collar 27 is shown clamped between the disk and the wheel hub by studs 12.

Figure 5:
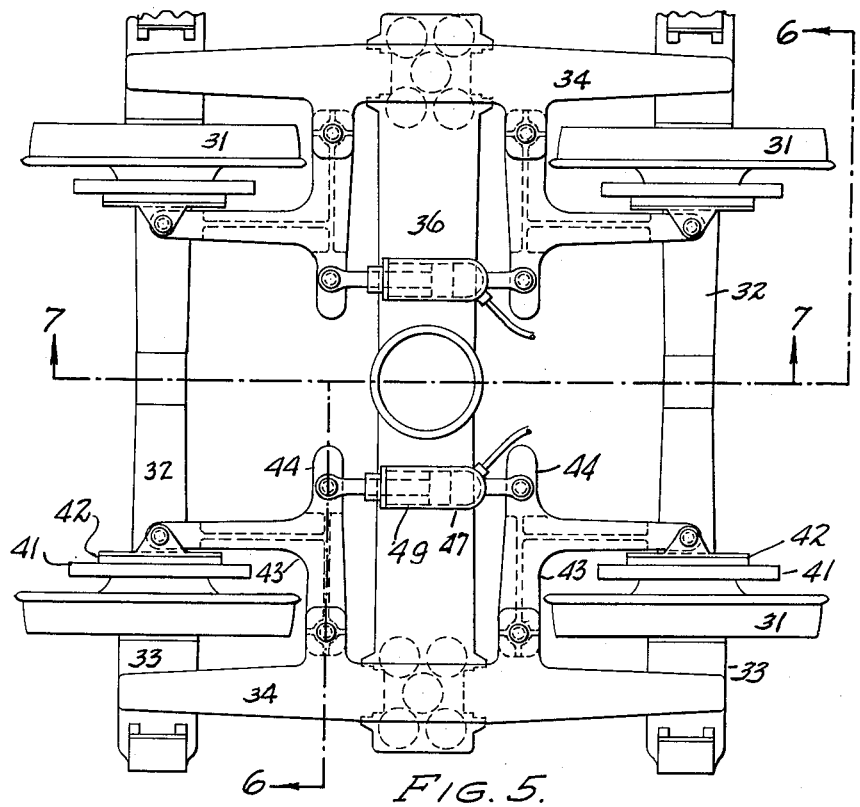
FIGURE 5 is a top view of a four-wheel truck illustrating another form of the invention.
Figure 6:
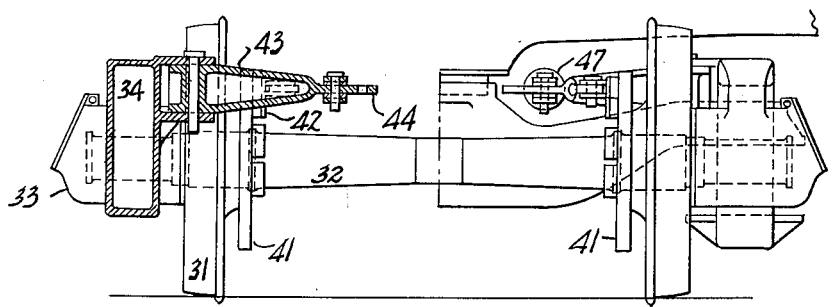
FIGURE 6 is a transverse vertical section and end view on line 6—6 of FIGURE 5.

The form of the invention illustrated in FIGURES 5, 6 and 7 includes wheel and axle assemblies 31, 32, journal boxes 33, side frames 34 and bolster 36, brake disks 41 and brake shoes 42, corresponding to those previously described.

The mounting members 43 extend inboard from the side frames and then lengthwise of the truck, as do the mounting members 13, but each member has a relatively short arm 44 extending inwardly of the truck from its longitudinal arm.

The two mounting members 43 at the same side of the truck are connected by a fluid pressure power device similar to that previously described and including a brake cylinder 47, secured to one mounting member arm 44, and piston 49 secured to the corresponding arm of the other mounting member at the same side of the truck.

FIGURE 8 illustrates the arrangement of FIGURES 5, 6 and 7 modified to mount a shoe 50 above the axle and a shoe 51 below the axle. These shoes are carried on the forked ends 52 of a mounting member 53 pivoted to the frame 54 at a lower level than members 43 in FIGURE 7. The operating cylinder 55 and its piston rod 56 may extend through openings in the bolster side walls for connection to a similar shoe mounting member on the other side of the bolster.

Each of the arrangements described avoids relative movement, vertically or longitudinally, between the brake shoes and the brake disks. There is no downward or upward loading of the mounting members due to the application of the brakes. At such times the mounting members of FIGURES 1–7 are either under compression or tension, depending upon the direction of rotation of the respective wheels. The same results would follow the mounting of the brake shoes at a lower level so that they would be applied to the brake disks below the level of the axles. In the arrangement of FIGURE 8 the shoes on each disk tend to move in opposite directions and accordingly there is less thrust on the mounting members.

In the event of failure of any one of the pin connections for a brake mounting member or for its brake shoe or shoes, there would still be effective application of the brake shoes to the remaining disks.

The fluid pressure operating devices are small in comparison with the usual brake cylinder and piston mounted on the car body and each is operatively connected direct to a pair of brake shoes applicable to a pair of disks. This arrangement avoids a substantial number of levers, brackets, brake beams, connection rods and pull rods, such as characterize the usual railway vehicle brake system.

The details of the structure may be varied other than as shown without departing from the spirit of the invention and the exclusive use of those modifications coming within the scope of the claims is contemplated.

What is claimed is:

1. In a railway truck brake arrangement for a railway truck having wheeled axles spaced apart lengthwise of the truck provided with fixed brake disks and having separate side frames spaced apart transversely of the truck and supported from the axles, levers at opposite sides of the truck disposed substantially horizontally at a level near the top portions of the disks, each having a vertical-axis fulcrum on the side frame at the same side of the truck at a point spaced lengthwise of the truck from one of said axles and with an end terminating adjacent to one of the disks on said axle, and a fluid pressure operated axially aligned cylinder and piston operatively connected to and carried solely by the levers pivoted to the same side frame, and brake shoes mounted on said levers and applicable to said disks upon actuation of said cylinders and pistons.

2. A brake arrangement for a railway vehicle truck having wheel and axle assemblies spaced apart lengthwise of the truck with fixed brake disks and having separate truck side frames supported from said assemblies, comprising a pair of substantially horizontally disposed members spaced apart longitudinally of each side frame and each having an upright pivotal connection to said side frame between the axles, said members having portions extending inboard of the truck from said pivotal connections and having portions extending toward the ends of the truck and terminating over the axles, a fluid pressure-actuated device carried solely by and operatively connected to the inboard portions of said members to swing said members horizontally about said pivots and relative to each other, and brake shoes carried by said over-axle terminal portions and movable by said device toward said disks to engage the same at a level near the top portions thereof.

3. In a brake arrangement for a railway truck having wheel and axle assemblies and a truck framing supported therefrom, there being brake disks rotatable with but fixed on the axles and positioned adjacent respective wheels, a pair of horizontally disposed levers spaced apart and each having a fixed upright-axis fulcrum support on the truck framing adjacent a respective wheel and having a swinging portion spaced from its fulcrum support and terminating adjacent to a respective one of said disks, a power device carried solely by said levers and operatively connected thereto at points spaced from their fulcrums, and brake shoes on the levers applicable to the upper portions of said disks upon operation of said device.

4. In a brake arrangement for a railway truck having wheel and axle assemblies and a truck framing supported therefrom, there being brake disks rotatable with but fixed on the axles and associated with individual wheels near opposite ends of the axles, a pair of horizontally elongated members spaced horizontally from each other and from the disks, upright-axis pivot fulcrums for said members on the truck framing and forming the sole supports for said members, brake shoes carried solely on said members and applicable to the upper portions of individual brake disks, and a single fluid pressure device between and supported solely on said members and operable to swing said members about said pivots to thrust said shoes against said disks.

5. A brake arrangement according to claim 4 in which the shoe and device carrying members form a unit of two members extending transversely of the truck and actuated by a single fluid pressure device and their shoes engage disks near opposite ends of the same wheel and axle assembly.

6. A brake arrangement according to claim 4 in which the shoe and device carrying members form a unit of two members spaced apart lengthwise of the truck framing and actuated by a single fluid pressure device and their shoes engage individual disks on spaced wheels and axle assemblies.

7. A brake arrangement according to claim 4 in which each shoe is substantially in the vertical plane of the axis of the associated wheel and axle assembly and is at substantially the same level as the pivoted members by which it is carried and the torque action of the assemblies on the brake shoes is applied lengthwise of the shoe-carrying members through the common power device.

8. A brake arrangement according to claim 4 in which each shoe is substantially directly above the axle of the assembly carrying the associated disk and is at substantially the same level as the pivoted members by which it is carried and the torque action of the assemblies on the brake shoes is applied lengthwise of the shoe-carrying members through the common power device.

9. A railway truck brake arrangement according to claim 3 in which the power device comprises a fluid pressure cylinder and piston unit, the cylinder being connected to one of the levers and the piston being connected to the other of the levers.

References Cited in the file of this patent

UNITED STATES PATENTS

| | | |
|---|---|---|
| 598,766 | Campany | Feb. 8, 1898 |
| 1,040,846 | Barber | Oct. 8, 1912 |
| 2,174,401 | Farmer | Sept. 26, 1939 |
| 2,263,945 | Eksergian | Nov. 25, 1941 |
| 2,274,859 | Eksergian | Mar. 3, 1942 |
| 2,291,016 | Aurien | July 28, 1942 |
| 2,351,573 | Ledwinka | June 13, 1944 |
| 2,359,761 | Helsten | Oct. 10, 1944 |
| 2,406,440 | Sauer | Aug. 27, 1946 |
| 2,464,680 | Gaenssle | Mar. 15, 1949 |
| 2,765,881 | Pierce | Oct. 9, 1956 |
| 2,883,005 | Polanin | Apr. 21, 1959 |
| 2,903,097 | Busch | Sept. 8, 1959 |
| 2,903,098 | Busch | Sept. 8, 1959 |
| 2,947,384 | Busch | Aug. 2, 1960 |
| 2,954,102 | Busch | Sept. 27, 1960 |